United States Patent [19]

Bryce et al.

[11] 4,187,411
[45] Feb. 5, 1980

[54] ARC WELDING

[75] Inventors: Graham W. Bryce, Giffnock; Joseph J. Hunter, East Kilbride, both of Scotland

[73] Assignee: The Secretary of State for Industry in Her Britannic Majesty's Government of the United Kingdom of Great Britain and Northern Ireland, London, England

[21] Appl. No.: 843,187

[22] Filed: Oct. 18, 1977

[30] Foreign Application Priority Data

Oct. 25, 1976 [GB] United Kingdom ............... 44150/76

[51] Int. Cl.² ................................................ B23K 9/10
[52] U.S. Cl. .................................. 219/137.2; 73/627; 219/137.71
[58] Field of Search ................. 219/136, 137.2, 137.7, 219/137.71; 73/597, 598, 609, 614, 615, 616, 627, 628, 629

[56] References Cited

U.S. PATENT DOCUMENTS

| | | | |
|---|---|---|---|
| 2,656,714 | 10/1953 | Cartier | 73/629 |
| 2,721,249 | 10/1955 | Landis et al. | 219/137.7 |
| 3,135,858 | 6/1964 | Lesnewich | 219/137.7 |
| 3,872,715 | 3/1975 | Pittaro | 73/609 |
| 3,986,389 | 10/1976 | Mesina et al. | 73/614 |
| 4,070,917 | 1/1978 | Niklas et al. | 73/598 |

*Primary Examiner*—Bruce A. Reynolds
*Assistant Examiner*—Clifford C. Shaw
*Attorney, Agent, or Firm*—Pollock, Vande Sande and Priddy

[57] ABSTRACT

Apparatus for use in the control of arc welding, especially the automatic control of consumable electrode arc welding employs a technique of reflecting an ultrasonic pulse from that end of a strip of weld filler material which is melting into the weldpool. The time taken from transmission to return of the ultrasonic pulse is measured to provide a measure of the length of filler material projecting beyond the welding torch, which can then be used eg to facilitate automatic control of the welding process. Apparatus using magnetostrictive and or magnetoelastic methods of ultrasonic pulse transmission and reception are described. Also apparatus using a piezo-electric method for pulse transmission and reception is described which is especially useful for a non-ferromagnetic weld filler strip.

16 Claims, 13 Drawing Figures

ARC WELDING

This invention relates to arc welding, and more particularly (but not exclusively) is concerned with means for facilitating the automatic control of consumable-electrode arc welding processes.

In consumable-electrode arc welding processes, the consumable electrode, normally in the form of a wire, is fed continuously through a welding torch or gun in which electrode current providing the energy necessary to sustain the arc is supplied to the wire. The free end of the wire projects beyond the welding torch by a distance known as the stick-out distance, and during the welding process an electric arc is maintained between the free end of the wire and the workpiece, the wire burning off to supply the weld filler material.

Important factors in controlling the quality of the weld so produced, are the stick-out distance and the total distance from the welding torch to the weldpool on the workpiece. These factors are to some extent interdependent, and if the stick-out distance is known, the total distance can be estimated from a knowledge of the arc voltage, since arc length is directly related to arc voltage.

During the course of a welding run, the stick-out distance may vary as a result of a number of possible causes. In the case of a manually operated welding torch, maintenance of an optimum stick-out distance depends upon the skill of the operator. In the case of an automatically positioned welding torch, the total torch to weldpool distance can vary for example as a result of thermal distortion of the workpiece, or some protuberance in the weld path such as a tack weld which has not been allowed for.

If the arc voltage remains substantially constant, then so also does the arc length and such variations will be directly reflected in changes in the stick-out distance.

Even small variations in the stick-out distance, of the order of one millimeter, can adversely affect the quality of the weld. For example, when operating from a constant voltage supply, the arc voltage is affected by the voltage drop in the stick-out, which of course depends upon the stick-out distance. Also, changes in the resistive heating effect on the stick-out wire can result in undesirable changes to the manner in which the wire melts into the arc. Larger variations can additionally detract from welding efficiency. An excessive length of stick-out, especially when the welding wire is not straight, can cause misalignment of the arc with the desired weldpath. On the other hand, in the extreme case where the stick-out is reduced to zero, the arc burns back to the welding torch and the process must be halted while the torch is replaced.

It is thus highly desirable to provide some means of monitoring the stick-out distance (or the torch to weldpool distance) in order that these factors can be automatically controlled. However, measurement of the length of the projecting end of a moving wire carrying a large current and discharging an electric arc from its free end clearly presents considerable practical difficulty.

In one known form of automatic welding apparatus, an optical method of measurement is employed, in which a TV camera is focussed on the arc and directly indicates its length. The stick-out distance can also be inferred by this method, if the welding torch is fixed relative to the camera. However, unwieldy and fragile equipment is required, and this method is hence not very convenient for use in welding apparatus.

Another possible method might be to measure the welding current and voltage, hence to deduce the stick-out distance and arc length. This method is used in non-consumable electrode welding methods using a constant current supply. The arc voltage is sensed, and kept constant by adjusting the electrode to weldpool gap using a servo mechanism. The known method is not appropriate to consumable electrode arc welding, however, because the arc is struck from the free end of the welding wire, not from the torch. The same torch voltage to current relationship can thus be obtained with various combinations of arc length and stick-out distance so that neither of these factors is uniquely determined.

According to the present invention, welding apparatus comprises in combination a welding torch and means for monitoring the stick-out distance of a strip of consumable weld filler material beyond the tip of a welding torch, said monitoring means including means for transmitting a pulse in the form of an ultrasonic sound disturbance along the strip;

means for providing a first signal at an instant corresponding to the passage of the pulse past a first station separated from the welding torch tip by a fixed path length of the strip;

means for providing a second signal at an instant corresponding to the passage past a second station of the pulse reflected from the free end of the strip, the second station being separated from the welding torch tip by a fixed path length of the strip;

and means responsive to the time interval between the first and second signals for providing a measure of the stick-out distance.

As will be seen hereinafter, the invention has application to various arc welding processes which involve use of a consumable weld filler material, and the term torch should accordingly be understood to refer to the holder or guide for the strip of filler material in any of these applications. Thus the term is intended to embrace that which is sometimes referred to as a welding gun in MIG welding, or as a welding head in automatic welding apparatus, as well as that which is commonly referred to as a welding torch eg in TIG welding.

For consumable electrode arc welding processes, the strip will normally be the consumable electrode, which is usually in the form of a wire. However, apparatus in accordance with the invention does have uses referred to hereinafter in connection with non-consumable electrode arc welding processes, and in these cases the term strip is intended to refer to a strip of consumable weld filler material, normally in the form of a wire, used therein.

It will also be appreciated that the first and second signals need not necessarily be generated at instants when the pulse is actually propogating within the strip; it is necessary only that the instants when the first and second signals are provided should bear some fixed relation with instants when the pulse passes the first and second stations respectively.

Although mechanical means could be employed for the generation of the pulse transmitted through the strip, mechanically generated pulses usually tend not to have the desired waveform for the purpose of the invention, which waveform should preferably be well defined and of short duration. Furthermore, the monitoring of stick-out distance normally requires the measurement of the length of a moving strip or electrode, and it is therefore usually simpler to use a monitoring method which avoids the need for physical contact between the moving strip and the monitoring apparatus. The majority of all welding operations are for the welding of steel, and in these cases (and others where the filler strip is of ferromagnetic material) the invention makes possible a particularly convenient approach avoiding the need for such contact by using the magnetostrictive or magnetoelastic effects.

However, this approach is not possible when welding with a non-ferromagnetic strip eg one of aluminum or stainless steel. In these cases a mechanical contact method using a piezo-electric effect can be employed with advantage.

Magnetostrictive effects can be classed into two categories, the first of these being the Joule, or direct magnetostrictive effect whereby the physical dimensions of a ferromagnetic material can be made to change by subjecting the material to a change in magnetic flux density. The desired ultrasonic disturbance can thus conveniently be introduced into the strip by providing means for arranging for a sudden change in the magnetic flux density passing through the strip. According to a preferred form of the invention therefore, means for transmitting an ultrasonic pulse along the strip comprises an inductive coil in the vicinity of, and preferably surrounding the strip of weld filler material. Apparatus for supplying a pulse of current can then be connected to the coil so that an ultrasonic pulse can be introduced into the strip by virtue of the direct megnetostrictive effect. One convenient manner of providing the first signal then is to obtain an electrical signal in response to the generation of the current pulse in the coil.

The second category of magnetostrictive effect is the so-called inverse or Villari magnetostrictive effect, whereby a deformation of a ferromagnetic material causes a change in the magnetic flux density in the vicinity of the material. A similar phenomenon is the magnetoelastic effect, which is a change in the magnetic permeability of a ferromagnetic material consequent upon deformation. Either or both of these effects can be used to provide the desired signal in response to the passage of the direct and/or the reflected ultrasonic pulse. In a convenient form of the invention, therefore, detection means for providing the said first signal and/or the said second signal comprise a magnetostrictive or magnetoelastic transducer in the vicinity of the strip. Suitable transducers for providing the said first and/or second signal include an inductive coil preferably surrounding the strip, a Hall effect transducer, or a megnetoresistor.

In general, the magnitude of the magnetic disturbance caused by the passage of the ultrasonic pulse (or of the reflected pulse), and hence the strength of a signal generated in response thereto, can be increased by the provision of a bias magnetic field in the region of the detection means employed to provide the signal. Also, a bias magnetic field can be employed in the region of the transmitter coil to increase the magnitude of the transmitted pulse. In each case the bias field can be supplied, for example, by an inductive coil through which an electric current can be made to pass, or by a permanent magnet or alternatively a permanent magnetic field can be introduced into the strip itself before it enters the region of the transmitter or detection means.

It will be apparent that the strength of the signal can also be enhanced by the use of a sheathing of ferromagnetic material, which can also serve as a screen for excluding stray external noise. It will also be apparent that, instead of placing coils, detectors, etc in direct physical proximity to the strip, they may alternatively in appropriate cases be linked thereto through a suitable magnetic circuit. This approach may be convenient, for example, to avoid the need for threading a welding electrode through an inductive coil.

The time interval between the said first and second signals is directly related to the stick-out distance, and means responsive thereto for controlling or indicating the magnitude of the stick-out distance can therefore conveniently include electronic means for converting this time interval to an electrical third signal representative of the magnitude of the stick-out distance. Such a third signal can then be used to control a servo mechanism to maintain a desired stick-out distance, or can alternatively be used merely to drive an indicator.

Suitable time registering circuits are known to the art, and can, for example, operate by switching on a timing signal in response to the first signal, the timing signal consisting of electrical pulses having a known repetition rate, eg 10 MHz. The timing signal would then be switched off in response to the second signal, and the time interval between the first and second signals determined by means of an electronic pulse counter, driven by the timing signal. Alternatively an analogue circuit might be used, for example one in which a voltage "ramp" of predetermined rate is started by the first signal and stopped by the second signal, so that the voltage reached provides a measure of the required time interval. This latter approach can be put into effect by use of a voltage integrating circuit having integrate, hold, and re-set modes. A constant voltage is applied to the input of the integrating circuit, which is switched to the "integrate" mode by the first signal, and to the "hold" mode by the second signal. The integrator voltage is then transferred to a sample-and-hold amplifier, and the integrator is thereafter re-set to zero before the next transmission pulse is received.

The relationship between the said time interval and the stick-out distance will of course depend upon the velocity of sound in the material of the welding electrode, and this can vary from one material to another, and also as a result of changes in temperature in the welding electrode. For accurate monitoring of the stick-out distance it may therefore be necessary to provide means for allowing for these variations. However, the velocity of sound does not vary greatly for most steel compositions in common use, so for many practical applications no correction for this factor will be necessary. If it is desired automatically to take into account variations in the speed of sound from one material to another, this can be achieved by timing an ultrasonic pulse between fixed stations spaced apart on the welding electrode. This gives a measure of the speed of sound in the material of the weld wire, which can be used in computing the stick-out distance and hence provide automatic allowance for variations in the velocity of sound between different welding electrode materials. In regard to temperature effects, once equilibrium conditions are reached in the welding process, the effect of temperature will introduce a constant error. This error is small enough to ignore for most purposes, but otherwise can be allowed for by introducing the appropriate correction electronically into the control means.

It should be noted that the reflected pulse is received after reflection from the liquid/solid interface at the end of the stick-out wire, whereas there is a molten tip to the wire whose length, which is generally small, is not taken into account.

One embodiment of the invention will now be described by way of example only with reference to the accompanying drawings, of which

Figure 1:
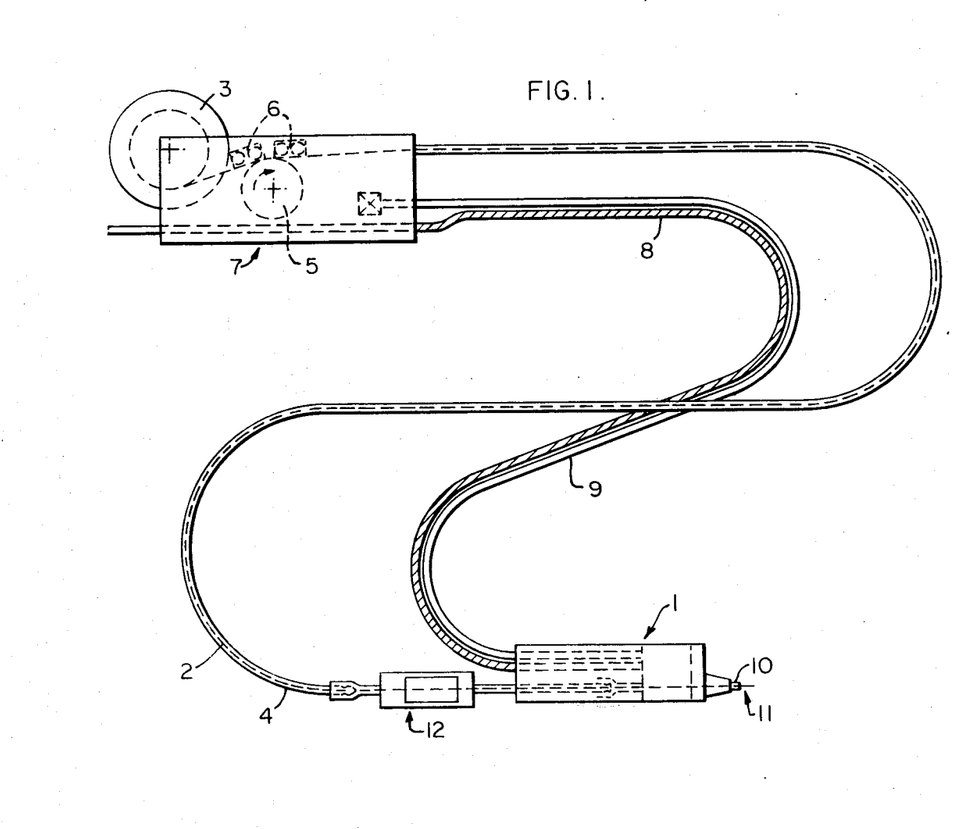
FIG. 1 is a diagrammatic representation of arc welding apparatus incorporating a welding electrode stick-out monitor in accordance with the invention.

As shown in FIG. 1, apparatus for consumable electrode inert gas shielded metal arc welding (so-called MIG - welding apparatus) comprises a welding torch 1 through which a welding electrode in the form of a copper plated steel welding wire 2 is fed from a storage reel 3 via a flexible guide tube 4. The wire 2 is fed to the welding torch under the action of a wire driving unit comprising a wire drive wheel 5 powered by an electric motor (not shown), the wire being held in frictional contact with the drive wheel 5 by pinch rollers 6. The wire driving unit is housed in a feed unit generally indicated as 7, through which electrical power and a supply of inert gas can be provided to the welding torch 1 respectively via a flexible power cable 8 and a gas tube 9.

During use of the apparatus, the wire 2 projects beyond the tip 10 of the welding torch by a distance known as the stick-out distance, this length of wire being generally indicated as 11. A supply of inert gas such as carbon dioxide is supplied via the tube 9 to an annular orifice surrounding the welding wire at the point where it emerges from the tip of the torch 1.

During the welding operation, electric current supplied to the welding torch through the power cable 8, is transferred to the welding wire 2 via a contact tube (not shown) through which the wire passes at a location within the welding torch and close to the tip 10 thereof. The electric current, supplied from a constant voltage source, sustains en electric arc between the free end of the wire 2 and the workpiece (not shown), and electrical energy thus made available in the arc causes the wire 2 to melt into a weldpool formed on the workpiece as it is supplied to the torch.

During the course of the welding operation, inert gas supplied to the torch via tube 9 provides a shroud around the stick-out end of the wire 2, the electrode arc, and the weldpool to prevent contamination (eg oxidation) thereof by the atmosphere.

Coupled to the wire feed tube 4 just upstream of the welding torch 1 is a module 12 for use in monitoring the stick-out distance 11 of the wire 2 beyond the tip 10 of the torch 1. The module 12 and some of its associated electrical circuitry is shown in greater detail in FIG. 2. As shown therein, the module 12 contains three inductive coils wound upon a common former 13 through the center of which the wire 2 passes. The three inductive coils are a transmitter coil 14, a receiver coil 15 positioned downstream thereof in the direction of wire feed, and a bias coil 16 wound to extend over and beyond the exterior of each of the coils 14, 15.

Figure 2:
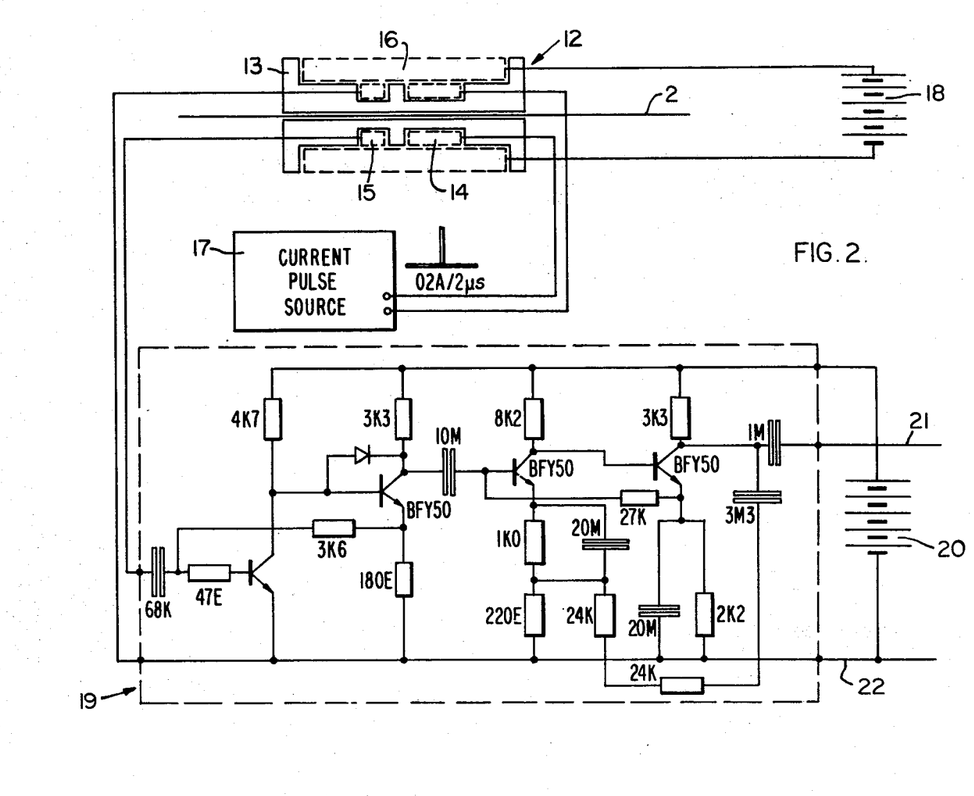
FIG. 2 shows schematically in greater detail a module and electrical circuitry transmitting and signalling the passage of an ultrasonic pulse along the welding electrode in the apparatus of FIG. 1.

A current pulse source 17 is connected to provide an input to the transmitter coil 14, a bank of batteries 18 is connected to provide a continuous current to the bias coil 16, and an amplifying circuit, generally indicated as 19, powered by batteries 20 amplifies the output of receiver coil 15, and provides an amplified output signal between conductors 21, 22.

In use of the apparatus, while welding wire 2 is fed continuously to the welding torch 1, the current pulse source 17 generates a train of electric current pulses, which in turn create a train of pulses of magnetic flux in the transmitter coil 14. By virtue of the Joule (direct magnetostrictive) effect this results in a train of ultrasonic pulses being transmitted down the weld wire 2. In trials a Solartron (Trade Mark) Type G01377 current pulse generator has been used which has a facility for producing a delayed pulse, related to the main current pulse. The delayed pulse was used as a first signal generated at an instant indicative of the instant of transmission of an ultrasonic pulse past a first station (the transmitter coil location) separated from the welding torch tip by a fixed electrode wire path length.

Each ultrasonic pulse is transmitted along the electrode wire 2, in the direction of the welding torch 1 (a similar pulse will also be transmitted in the direction of the reel 3, but is not of direct interest). The pulse is reflected from the free end of the wire 2, and the reflected pulse is transmitted back along the wire. As the reflected pulse passes the receiver coil 15, a pulse of current is generated therein owing to the Villari effect and/or magnetoelastic effect. This pulse of current thus constitutes a second signal provided at an instant corresponding to the passage of the reflected pulse past a second station (the receiver coil location) separated from the welding torch tip by a fixed electrode path length. The bias coil 16 through which a continuous steady current passes provides a bias magnetic field which serves to increase the magnitude of the second signal. The second signal is amplified in the electronic amplifier 19 whose output is provided across conductors 21, 22.

The receiver coil 15 will receive additional undesired signals resulting for example from reflections from the reel end of the wire, and also from direct coupling with the transmitter coil 14. In order to avoid confusion arising from these undesired signals, a gating arrangement is employed whereby the amplifier 19 is switched on to receive and amplify a signal only during the period when the desired pulse is expected, and the pulse repetition rate is so chosen as to minimize the possibility of confusion with reflected signals. It may also be necessary in some instances to provide a current limiter in the input circuit of the receiver amplifier 19 to avoid overload due to direct coupling between transmitter and receiver coils.

Figure 3:
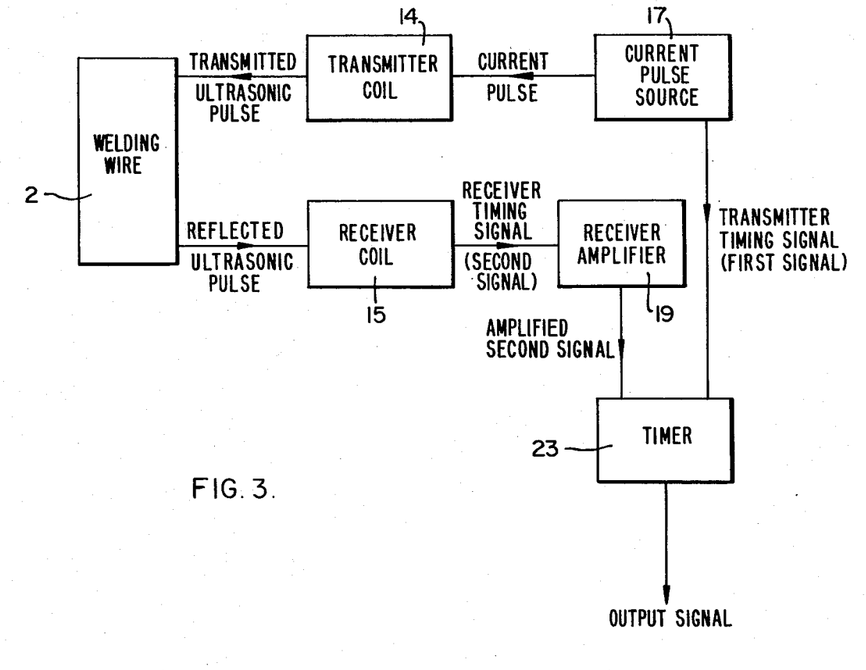
FIG. 3 is a block diagram showing the means by which various signals are created and processed in the apparatus shown in FIGS. 1 and 2.

As shown in block diagram form in FIG. 3, the first and second signals are processed in a time registering circuit 23 to provide an output signal which is a measure of the time interval between the first and second signals. The output signal is thus dependent upon the time taken for an ultrasonic pulse to travel from the transmitter coil 14 to the free end of the welding wire where it is reflected, plus the time taken for the reflected pulse to return to the receiver coil 15, plus time delays occurring in the electrical circuitry. The only variable (apart from errors due to temperature variations, etc.) among these factors determining the output signal is the wire stick-out distance, and this output signal is therefore directly representative of the magnitude of the wire stick-out distance. The output signal can thus be employed for example, either to drive an indicator giving a direct readout of the magnitude of the wire stickout, or to control the magnitude of the stick-out distance by means of a servo mechanism.

The specific form of the time registering circuit 23 per se forms no part of the present invention; examples of suitable types of time registering circuits have been described hereinbefore.

Figure 4A:
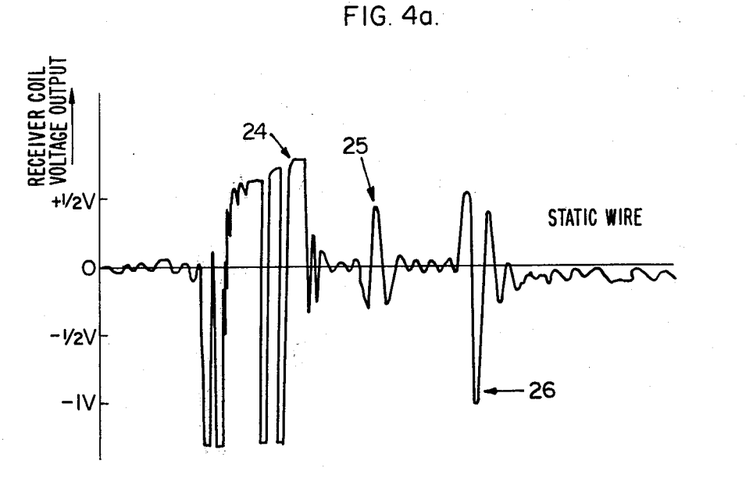
FIGS. 4a and 4b show details of the waveform as recorded on a cathode ray oscillograph of an amplified signal provided by a receiver coil employed in the apparatus shown in FIGS. 1 and 2.

FIGS. 4a and 4b show the waveforms as recorded on a cathode ray oscillograph of the output of receiver amplifier 19. In FIG. 4a there is shown the output waveform with the wire 2 static. Three main features apart from background noise can be observed in this waveform. At 24 there is shown a disturbance resulting from the passage of the transmitted pulse past the receiver coil 15, plus noise resulting from magnetic flux coupling between the transmitter and receiver coils 14 and 15. This disturbance is of no significance in the embodiment of the invention presently described, but in other embodiments could be employed to provide the first signal, indicating passage of the transmitted pulse through the wire. At 25, there is shown a disturbance due to reflection from the point where partial clamping of the wire occurs owing to friction in the welding torch. Finally, at 26, there is shown the disturbance caused by reflection of the pulse from the free end of the wire. This disturbance is used to provide the second signal by which the reflected pulse is detected. It will be observed that the general waveform of disturbances caused by respective reflections from clamped and free wire end locations are inverted with respect to each other.

Figure 4B:
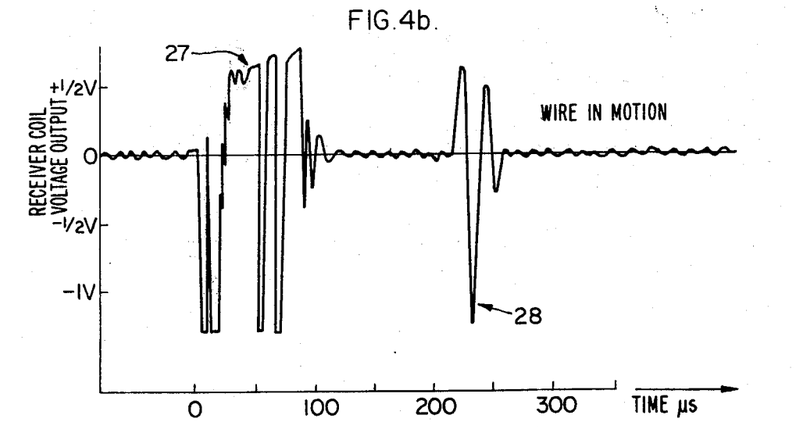

FIG. 4b shows the waveform obtained with the wire in motion. It will be observed that there is a disturbance 27 due to the passage of the transmitted pulse, and coupling between coils 14 and 15 closely similar to the disturbance 24. However, surprisingly there is no disturbance corresponding to the disturbance 25 caused by reflection from the torch. This is extremely fortunate, because it might have been expected that this reflection would have increased in magnitude due to motion of the wire, possibly to such an extent as to prevent a useful signal being derived from the pulse reflected from the wire tip. The amplitude of the reflected pulse from the wire tip is in fact increased with the wire moving, as indicated at 28, possibly due to reduced attenuation of the ultrasonic pulse in the torch.

When the welding arc is switched on, some reduction in the amplitude of the reflected waveform 28 is encountered as compared with that shown in FIG. 4b. However, somewhat surprisingly and fortunately, it is found that the signal to noise ratio of this reflected waveform is still sufficiently high to provide a useful signal even when the arc is switched on.

Figure 6:
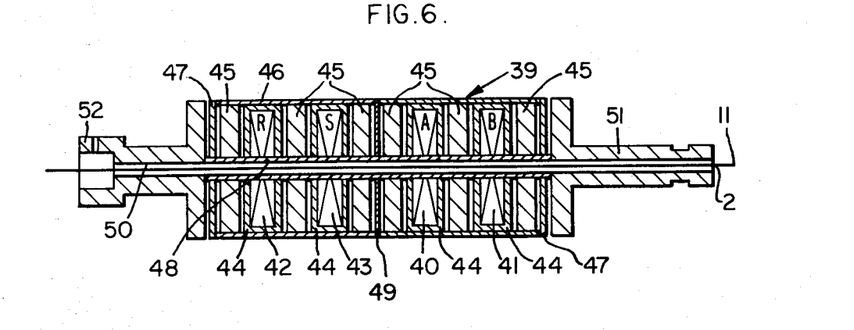
FIG. 6 shows diagrammatically in section a further alternative module for the transmission and reception of pulses by magnetostrictive/magnetoelastic means in the apparatus of FIG. 1.

In FIG. 6 there is shown a modified form of transmitting and receiving module 39 which can replace the module 12 in the apparatus shown in FIG. 1 with advantage in many instances. The module 39 is of cylindrical form and comprises A and B transmitter coils 40, 41 respectively, and R and S receiver coils 42, 43 respectively. Each coil is surrounded by a body of ferrite material 44 which serves to enhance the magnetic field generated by electric current flowing through the coil. Mounted between the coils are magnetic discs 45 magnetized along the axis of the module, which serve to provide a bias magnetic field in similar manner to the bias coil 16 shown in FIG. 2. The assembly of coils 40 to 43 with their associated ferrite surrounds 44 and magnetic discs 45 is enclosed by a casing comprising a brass screening sheet 46, mild steel and discs 47 and an inner brass tube 48 all of which casing is maintained at ground potential during use, to minimize stray external noise. The brass tube 48 is split longitudinally, and the end discs 47 are each provided with a radial slot, to minimize eddy current effects. A further, radially slotted mild steel disc 49, also maintained during use at ground potential, is provided between coils 40 and 43 to minimize direct coupling between transmitter and receiver coils. The discs and coils are all provided with a central aperture through which an insulating tube 50 passes from end to end of the device, and the welding wire 2 passes through this tube. The device is provided with end connectors 51, 52 by means of which it can be connected into the wire guide tube 4 (FIG. 1).

The purpose of the twin transmitter/twin receiver coil construction can be explained by reference to FIGS. 7a to d.

Figure 7A:
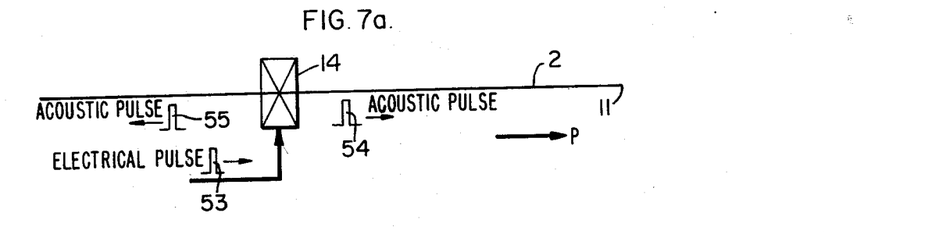
FIGS. 7a, b, c and d show schematically the pattern of transmitted and received pulses obtained in use of the module of FIG. 5.
Figure 7B:
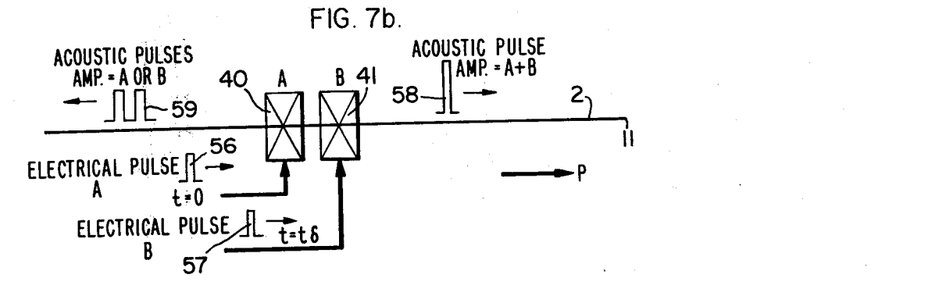
Figure 7C:
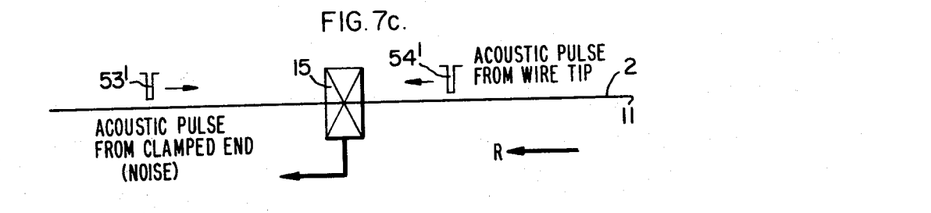

In FIG. 7a there is shown diagrammatically an electrical pulse indicated as 53 being applied to a transmitter coil 14 through which the weld wire 2 is passing. A desired ultrasonic pulse 54 passes down the wire towards the stick-out end 11 in the direction P, but inevitably there is a simultaneous ultrasonic pulse 55 propagated towards the opposite (reel) end of the wire. The pulse 55 gives rise to undesired back reflections eg from the wire drive unit 7 (FIG. 1). As shown in FIG. 7(c), the single receiver coil 15 will thus receive an undesired reflected pulse $53^1$ from the reel end of the wire as well as the desired reflected pulse $54^1$ from the wire end 11 travelling in the direction R. The pulses $53^1$ and $54^1$ can be of similar magnitude, and it can be difficult for the pulse receiver circuitry to distinguish between them, so that erroneous readings can be created.

In order to combat this problem, pairs of transmitter and receiver coils may be used. As shown diagrammatically in FIG. 7b, an electrical pulse 56 is applied to transmitter coil 40 and this gives rise to an ultrasonic pulse propagating in the desired direction P and a further undesired pulse propagating in the opposite direction. A second electrical pulse 57 is then applied after a time delay to the transmitter coil 41, which again gives rise to a pulse in each direction. The time delay is so chosen that the pulse from coil 41 is applied to the wire as the desired pulse from coil 40 passes the coil 41. The pulses propagating in the desired direction P are thus combined to form a single pulse 58 of increased amplitude. The pulses propagating in the opposite direction will remain separate as indicated at 59.

Figure 7D:
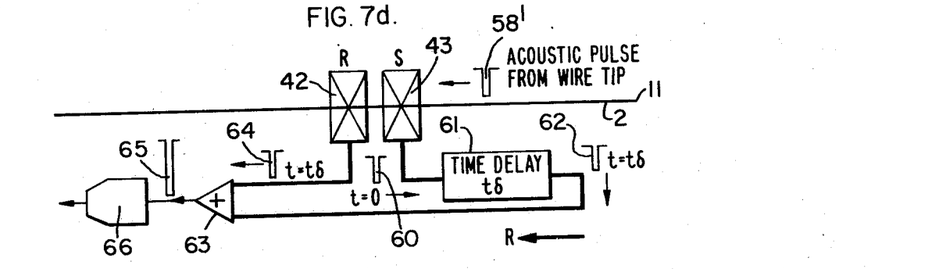

The reflected signal 58¹ from the wire tip propagating in the direction R, is first received by the coil 43, as shown in FIG. 7d. This gives rise to an electrical signal 60, which is passed through a time delay circuit 61 whence it emerges as a delayed signal 62 which is passed to an addition and amplifying circuit 63. When the reflected signal 58¹ passes the receiver coil 42, an electrical signal 64 is generated therein, and this also is passed to the addition circuit 63. The electrical delay induced by the delay circuit 61 is arranged to correspond with the time taken for the ultrasonic pulse to travel from coil 43 to coil 42, and hence the signals 62 and 64 combine to form a single combined signal 65 having increased amplitude. The combined signal 65 is then passed to a comparator circuit 66 which rejects all signals below a certain magnitude. As will be apparent from the foregoing, a signal which has been propagated in the direction P and reflected in the direction R from the wire tip will result in a signal 65 which is considerably larger than undesired signals resulting from stray reflections from other than the stick-out end of the wire 2.

Figure 8:
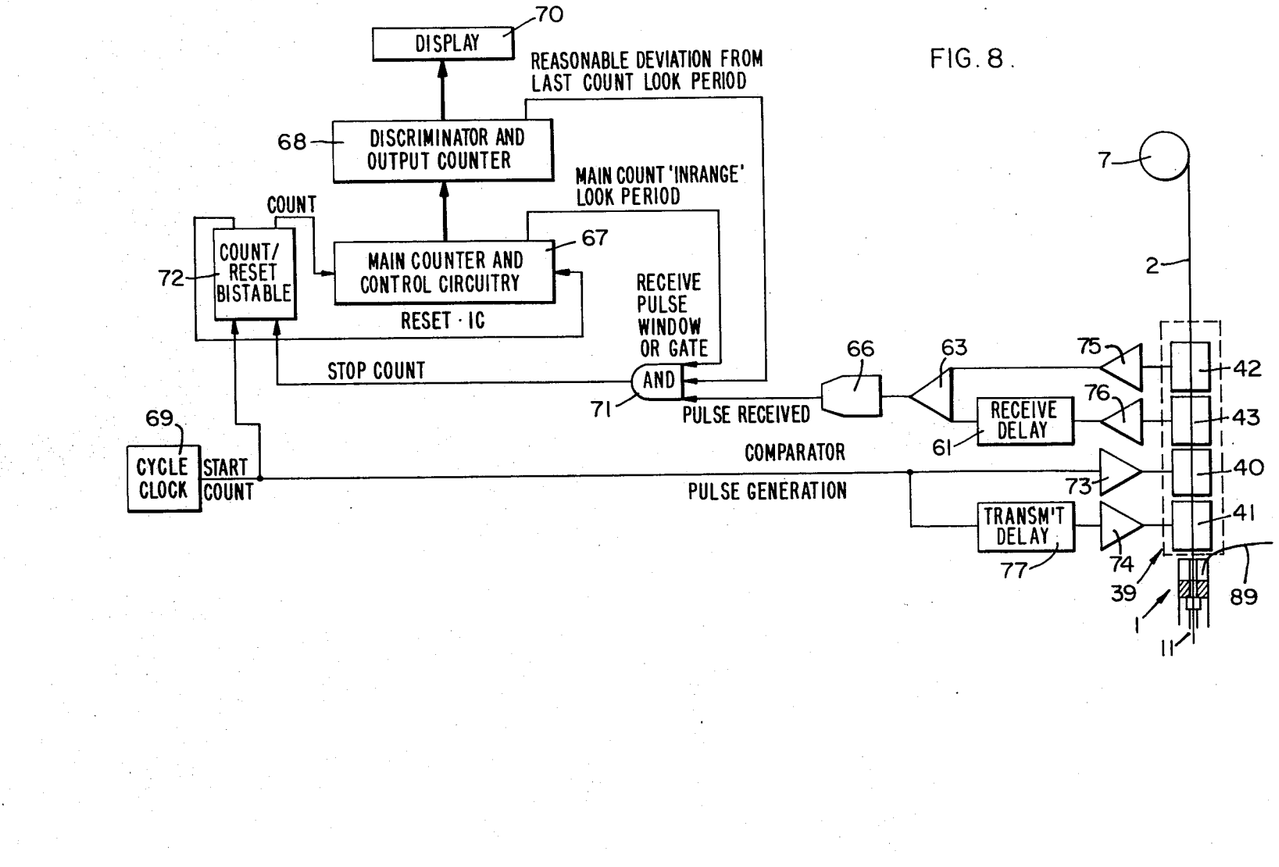
FIG. 8 shows in block diagram form the means by which the various signals are created and processed when the module shown in FIG. 6 is employed.

Turning now to FIG. 8 there is shown a block diagram of electrical circuitry for use in conjunction with the module 39 of FIG. 6 for pulse generation, reception and processing. The electrical circuitry comprises a binary 12-bit main counter 67 which includes a 10 MHZ crystal oscillator (not shown), a binary 8-bit output counter 68 which registers for output to display, or to control equipment, the wire extension measured as a result of previous cycles of system operation; a cycle clock 69 operating at 1 KHZ derived from the 10 MHZ crystal oscillator; a visual display 70, or device for controlling the wire feed rate, driven by the output counter 68; a gating circuit 71; and a count 67 reset bistable switch 72 controlling operation of the main counter; together with associated electrical connections, and amplifiers 73, 74, 75, 76 associated respectively with transmitter coils 40, 41 and receiver coils 42, 43.

The operation of the circuitry is as follows.

The 10 MHZ crystal oscillator within the main counter 67 is started and the cycle clock 69 begins to run, sending out a train of electrical pulses at a rate of 1 KHZ.

At the beginning of each cycle, ie immediately prior to the sending of a pulse from the clock 69, the main counter 67 is set to the complement of the "back-off time". The back-off time is the time it would take a reflected pulse to travel out and return from the torch tip. The output counter 68 is set to a value corresponding to earlier wire extension measurements. On generation of a trigger from the clock 69, transmitter coil 40 receives a pulse via amplifier 73, and transmitter coil 41 receives a pulse via a delay circuit 77 and amplifier 74 so that a combined ultrasonic pulse is dispatched along the wire 2 towards the stick-out 11 as described with reference to FIG. 7b. A signal is simultaneously applied to the bistable switch 72, which switches to start the main counter 67. At the end of the back off period, the main counter 67 passes from all 1's to all 0's, and it will be apparent that only at this stage is it possible that a reflected ultrasonic pulse will be received from the end of the welding wire beyond the torch tip. A signal is therefore applied from the main counter 67 to the gating circuit 71 from this stage for a period corresponding either to the full stick-out range catered for, or until a reflected pulse is received by the receiver coils 42, 43.

However, as well as this limitation on the gating circuit 71, the apparatus ensures that the reflected pulse return time is possible in relation to the maximum possible rate of change of wire stick-out, and the previous reading of wire stick-out magnitude. The output counter 68 thus incorporates a discriminator which provides a signal to the gating circuit 71 which permits it to remain open only for a period corresponding to possible deviations from the previously measured value of stick-out distance.

The reflected ultrasonic signal is received by the receiver coils 43 and 42, thence respectively on the one hand via amplifier 76 and delay 61, and on the other hand via amplifier 75 to addition and amplifier circuit 63 thence to comparator 66. As described with reference to FIG. 7d the comparator rejects signals below a certain value in order to discriminate against stray reflections not coming from the stick-out end 11. Only if a signal representing a reflected pulse is passed to the gating circuit 71 from comparator 66 while signals to open the gating circuit are being received from the main counter 67 and the output counter 68, is a signal passed on to the bistable switch 72 from the gating circuit. There is thus ensured a high probability that such a signal is derived from a genuine reflected ultrasonic pulse from the wire end, corresponding to the transmitted pulse at which the main counter 67 was started.

On receipt of a signal from the gating circuit 71, the bistable switch 72 operates to stop the main counter 67, thus storing a measure of the time at which the pulse arrived. This stored time of course corresponds to the magnitude of the stick-out 11. Control circuitry within the main counter 67 then causes automatic transfer of updating information from the main counter to the output counter 68. However, as a further safeguard against false readings, the output counter 68 is arranged to move by a predetermined number of bits towards the value thus stored by the main counter 67. For example, in one unit actually constructed the movement is limited to one bit per cycle, corresponding to a rate of change of wire stick-out of 250 mm/sec. Finally, the control circuitry within the main counter 67 resets the main counter to the complement of the back-off time before the cycle clock 69 initiates the next cycle. The arrangement is such that were no signal representing a reflected ultrasonic pulse to be received by the switch 72, the operation of up-dating the output counter would not occur, but the resetting procedure would take place normally.

Figure 5A:
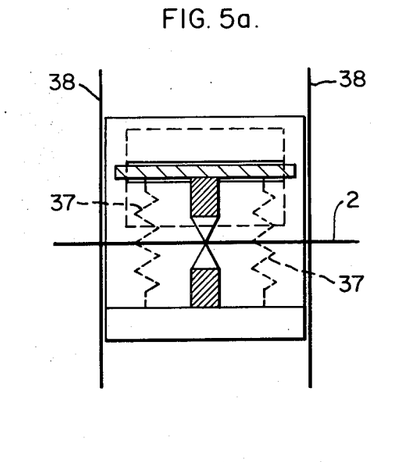
FIGS. 5a and b show respectively in diagrammatic form a side and an end section of a module for the transmission of a pulse along the strip by piezoelectric means.
Figure 5B:
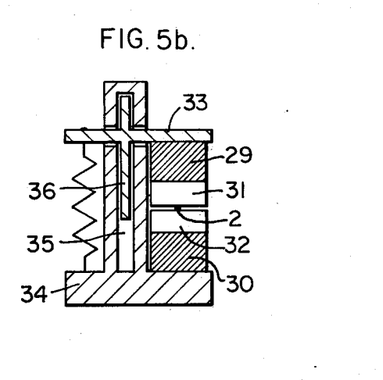

Turning now to FIGS. 5a and 5b, there is shown a piezoelectric device which can be used to introduce and to detect mechanically an ultrasonic pulse in the welding wire 2. This device can be used in place of the module 12 in the apparatus of FIG. 1, and it will be apparent that a multiple version may be used in place of that shown in FIG. 6. Piezoelectric excitation is especially useful when welding with a nonferromagnetic filler material such as aluminum or stainless steel. The device comprises a pair of piezoelectric crystals 29, 30 each carrying a knife-edged contact tip 31, 32 respectively. The upper crystal 29 (as shown in FIGS. 5a and 5b) is carried on a relatively massive upper support member 33, and the lower crystal on a relatively massive lower support member 34. The support members are relatively slideable towards and away from each other by virtue of an elongated slot 35 in the lower member in which an extension 36 of the upper member is a freely sliding fit. The two members 33, 34 are lightly spring urged towards one another by springs 37, and the whole device is slideable in fixed guides 38.

In use, the device is mounted in the fixed guides 38 with the crystals 29, 30 astride the wire 2 and the knife edges of the contact tips making gentle rubbing contact with the wire by virtue of springs 37. The whole device is free to move transversely of the wire feed direction in the guides 38 and the members 33, 34 can slide relative to one another in order to allow for any irregularities or bends in the wire. To generate an ultrasonic pulse in the wire, a voltage pulse is applied to both crystals simultaneously via electrical conductors (not shown), which causes them to expand rapidly and nip the wire instantaneously. When the reflected pulse from the wire end returns to the device a reverse effect occurs, i.e the piezo-electric crystals each receive a mechanical impulse which induces a voltage pulse in the electrical conductors. The voltage pulses corresponding to transmitted and received ultrasonic pulses can thus be used as the first and second signals, and the remaining operation of the monitor is similar to that described with reference to FIGS. 1 and 2.

The inversion of the reflected waveform as between the reflection from a clamped and free-end condition makes possible a number of advantageous uses of apparatus in accordance with the invention. For example, fault conditions such as sticking of the wire electrode in the torch and/or fusion of the electrode wire to the workpiece will provide a "clamped" reflected waveform from the receiver coil 15, which can be employed to give automatic warning of the fault.

Apart from its main use in connection with indicating or controlling stick-out, a survey of the workpiece prior to the welding operation is possible with apparatus in accordance with the invention, whereby the gap between the torch tip and the workpiece is measured with the welding arc off. This can be repeated at various locations. The wire drive must be reversible for this, and the method is, briefly, to run out the wire until it touches the workpiece, at which instant the stick-out distance is indicated by apparatus in accordance with the invention. Touching the workpiece might be detected for example by an electrical contact method, or by detecting the inversion of the reflected ultrasonic pulse signal which occurs when the end condition is altered from free to clamped.

Another possible application of apparatus in accordance with the invention is to provide a self adjusting weave motion. For example if the welding torch is traversed across a V-shaped weld joint the stickout length of the filler material will vary with the profile of the joint. By arranging for a steady forward motion, combined with reversal of the motion transverse of the joint when the stickout decreases to a predetermined value, a weaving motion can be provided. In such a motion the weave amplitude will be self-adjusting to compensate for initial misalignment or thermal distortion. The height of the welding head above the joint can also be controlled from the stickout monitor signal. Various weaving patterns may be employed. In some cases it may be advantageous to reduce the welding current during part of the welding cycle to a low value where the arc is still sustained but the electrode wire is not being melted off. This allows the gap from the torch to the workpiece to be measured at places where it is not desired to deposit a weld bead. For example a circular motion of the arc may be superimposed on the forward motion along the weld joint either by mechanically rotating the torch or magnetically rotating the arc. The circle can be large enough to traverse the edges of the weld joint and the mean direction of the torch movement may be adjusted from information so derived. Other complex weaving motions may be employed to similar ends.

Another application where the joint profile can be measured is where a plurality of strips of filler material are simultaneously fed through individual torches fixed in a single welding head. If each strip is provided with a stickout monitor, then information derived therefrom can be used to position the welding head accurately as well as controlling the operation of each individual torch.

Control of wire extension is particularly important with constant current excitation since this mode of operation lacks the self-regulation of the arc which is normally available with other modes of operation, such as with constant voltage.

It will be apparent that apparatus in accordance with the invention can be modified for use in TIG welding operations of the type where a consumable filler wire is continuously supplied to and melted into a weldpool formed by an arc struck between a non-consumable electrode and the workpiece. Monitoring of the stick-out distance of the filler wire beyond the tip of the non-consumable electrode can be useful for the detection of a fault condition which might arise should the filler wire become mis-directed away from the weldpool, thus resulting in the release of a considerable length of welding wire. Early detection of an excessive stick-out could prevent this by permitting a rapid manual or automatic stoppage of the welding process. Modifications for such use in TIG welding and similar operations should be considered as within the scope of the invention.

The invention can also be useful in connection with automatic arc welding using a consumable stick electrode, to monitor the length of the stick as it burns away, so that the stick can be replaced automatically, eg from a magazine, at the appropriate time.

Other arrangements than those described to provide the transmitter, receiver, and bias coils 14, 15, 16 are possible. In some circumstances it may be convenient to employ one single coil to fulfil the functions of both transmitter and receiver coils 14, 15 and in this event it would be important to provide a signal limiter to protect the receiver amplifier against overload, as discussed hereinbefore. A further approach which might prove convenient would be to use the same single coil additionally as a bias coil. In this event, the transmitted ultrasonic pulse could be generated by applying to the coil a current step (rather than a pulse) from a high impedance constant current source. The sharp increase in current would cause an ultrasonic pulse to be transmitted down the wire, and the coil current would be maintained until the reflected pulse passes the coil, and induces a voltage pulse therein. This coil current also produces the desired bias magnetic field. The coil current is then reduced to zero before applying a further current step to induce the next in a train of ultrasonic pulses.

There is, of course, no necessity for the transmitter coil, or other means for introducing the ultrasonic pulse, to be positioned close to the receiver coil or to the welding torch. The transmitted pulse can be introduced at any convenient point along the wire, for example in the feed unit 7. It is, however, obviously desirable for accurate monitoring that the path length from the first (transmitted pulse) station to the second (received pulse) station should not be excessively large in relation to the stickout distance.

Other possible modifications to the invention as described, but still within the overall scope of the invention, will be apparent to those skilled in the art.

We claim:

1. Welding apparatus comprising a welding torch, means for substantially continuously feeding a strip of consumable weld filler material through said welding torch during the course of a welding operation, and means for monitoring the stick-out distance of said strip of consumable weld filler material beyond the tip of said welding torch while said strip is in motion through said torch, said monitoring means comprising means for transmitting a pulse in the form of an ultrasonic sound disturbance along said moving strip;

means for providing a first signal at an instant corresponding to the passage of the pulse past a first station separated from the welding torch tip by a fixed path length of said moving strip;

means for providing a second signal at an instant corresponding to the passage past a second station of the pulse reflected from the free end of said moving strip, the second station being separated from the welding torch tip by a fixed path length of the strip;

and means responsive to the time interval between the first and second signals for providing a measure of the magnitude of the stick-out distance of said moving strip of weld filler material.

2. Apparatus according to claim 1 wherein the means for transmitting an ultrasonic pulse along the strip comprises an inductive transmitter coil.

3. Apparatus according to claim 2 including means for providing a bias magnetic field in the region of the transmitter coil.

4. Apparatus according to claim 3 wherein the means for providing a bias magnetic field comprises an inductive bias coil.

5. Apparatus according to claim 3 wherein the means for providing a bias magnetic field comprises a permanent magnet.

6. Apparatus according to claim 1 including detection means for providing at least one of the said first and second signals, said detection means comprising a magnetostrictive or magnetoelastic transducer.

7. Apparatus according to claim 6 wherein the detection means comprises an inductive receiver coil.

8. Apparatus according to claim 7 including means for providing a bias magnetic field in the region of the receiver coil.

9. Apparatus according to claim 8 wherein the means for providing a bias magnetic field comprises an inductive bias coil.

10. Apparatus according to claim 8 wherein the means for providing a bias magnetic field comprises a permanent magnet.

11. Apparatus according to claim 7 wherein the inductive receiver coil is enclosed within a casing of electrically conducting material to provide screening from external electrical noise.

12. Apparatus according to claim 1 wherein the means for transmitting an ultrasonic pulse along the strip comprises a piezoelectric crystal.

13. Apparatus according to claim 12 comprising a pair of piezoelectric crystals each mounted in a holder, the holders being resiliently urged towards one another, and the crystals each being provided with sharp contact edges, the said contact edges facing one another so that the strip can be embraced therebetween.

14. Welding apparatus comprising a welding torch, and means for monitoring the stick-out distance of a strip of consumable weld filler material beyond the tip of said welding torch, said monitoring means comprising means for transmitting a pulse in the form of an ultrasonic sound disturbance along the strip;

means for providing a first signal at an instant corresponding to the passage of the pulse past a first station separated from the welding torch tip by a fixed path length of the strip;

means for providing a second signal at an instant corresponding to the passage past a second station of the pulse reflected from the free end of the strip, the second station being separated from the welding torch tip by a fixed path length of the strip;

and means responsive to the time interval between the first and second signals for providing a measure of the magnitude of the stick-out distance;

said means for transmitting an ultrasonic pulse along the strip comprising means for generating an electrical pulse constituting the said first signal, a first inductive transmitter coil and spaced therefrom a second inductive transmitter coil, connection means by which the electrical pulse may be applied to the first inductive transmitter coil, and connection means including a time delay means by which the electrical pulse may be applied to the second inductive transmitter coil after a time delay.

15. Apparatus according to claim 14 wherein the means for providing the said second signal comprises a first inductive receiver coil and a second inductive receiver coil spaced therefrom, an addition means, connection means by which an electrical pulse induced in the first receiver coil may be applied to the addition means, and connection means including a time delay means by which an electrical pulse induced in the second receiver coil may be applied to the addition means, the addition means being operable to provide an output equal to the sum of the electrical pulses from said first and second receiver coils if received simultaneously.

16. Apparatus according to claim 15 further comprising a switch having first and second positions;

a time measurement device whose operation is controlled by the switch;

connection means by which the said electrical pulse may be applied to the switch to start the time measurement device;

a memory device for storing a previously derived measurement related to the said stick-out distance;

a comparator connected to receive the output of the addition means and to provide an output only when the output of the addition means exceeds a predetermined value;

a gating circuit provided with input connections from the comparator, the time measurement device, and the memory device, said gating circuit being adapted to provide an output constituting the said second signal only on simultaneous receipt of an output from the comparator, a signal from the time measurement device indicating that the time elapsed from the generation of the first signal is within a predetermined range, and a signal from the memory device indicating that the time elapsed from the generation of the first signal differs from the stored value by no more than a predetermined value;

a connection means by which the output from the gating device can be applied to the switch to stop the time measurement device, said time measurement device therefore recording the time interval between the first and second signals;

and a connection means between said time measurement device and said memory device whereby the measurement stored by said memory device is caused to change by no more than a predetermined amount towards the interval so recorded by the time measurement device.

* * * * *